L. TAYLOR.
FRICTION CLUTCH AND COUPLING.
APPLICATION FILED FEB. 7, 1914.

1,142,541.

Patented June 8, 1915.
3 SHEETS—SHEET 1.

WITNESSES.
John C Sanders
H. B. Cottrell

INVENTOR.
Leonard Taylor.
By his Attorney

L. TAYLOR.
FRICTION CLUTCH AND COUPLING.
APPLICATION FILED FEB. 7, 1914.

1,142,541.

Patented June 8, 1915.
3 SHEETS—SHEET 3.

WITNESSES.
John C. Sanders
H. B. Cottrell

INVENTOR.
Leonard Taylor
By his Attorney M. Wallace White

UNITED STATES PATENT OFFICE.

LEONARD TAYLOR, OF SLATTOCKS, CASTLETON, ENGLAND.

FRICTION CLUTCH AND COUPLING.

1,142,541. Specification of Letters Patent. Patented June 8, 1915.

Application filed February 7, 1914. Serial No. 817,129.

*To all whom it may concern:*

Be it known that I, LEONARD TAYLOR, a subject of the King of Great Britain and Ireland, residing at 17 Thornham Lane, Slattocks, Castleton, in the county of Lancaster, England, have invented new and useful Improvements in Friction Clutches and Couplings, of which the following is a specification.

This invention relates to a friction clutch or coupling of that type in which the clutching effect is obtained by contracting or binding flexible encircling metallic or other bands around annular or curved facings by acting on pivoted levers or like band controlling gear.

The improved clutch incorporates in its construction one, two, or more flexible bands which are housed by and act on the clutch casing, which casing also effectively houses two pivoted levers fulcrumed upon a flanged boss. This flanged boss also supports a simple clutch actuating lever, fulcrumed thereto, and which is worked by a sliding sleeve and intermediate link. I also provide means which tend to prevent the studs, upon which the pivoted levers are fulcrumed, from moving apart, and arrangements for this purpose are shown.

Figure 1:
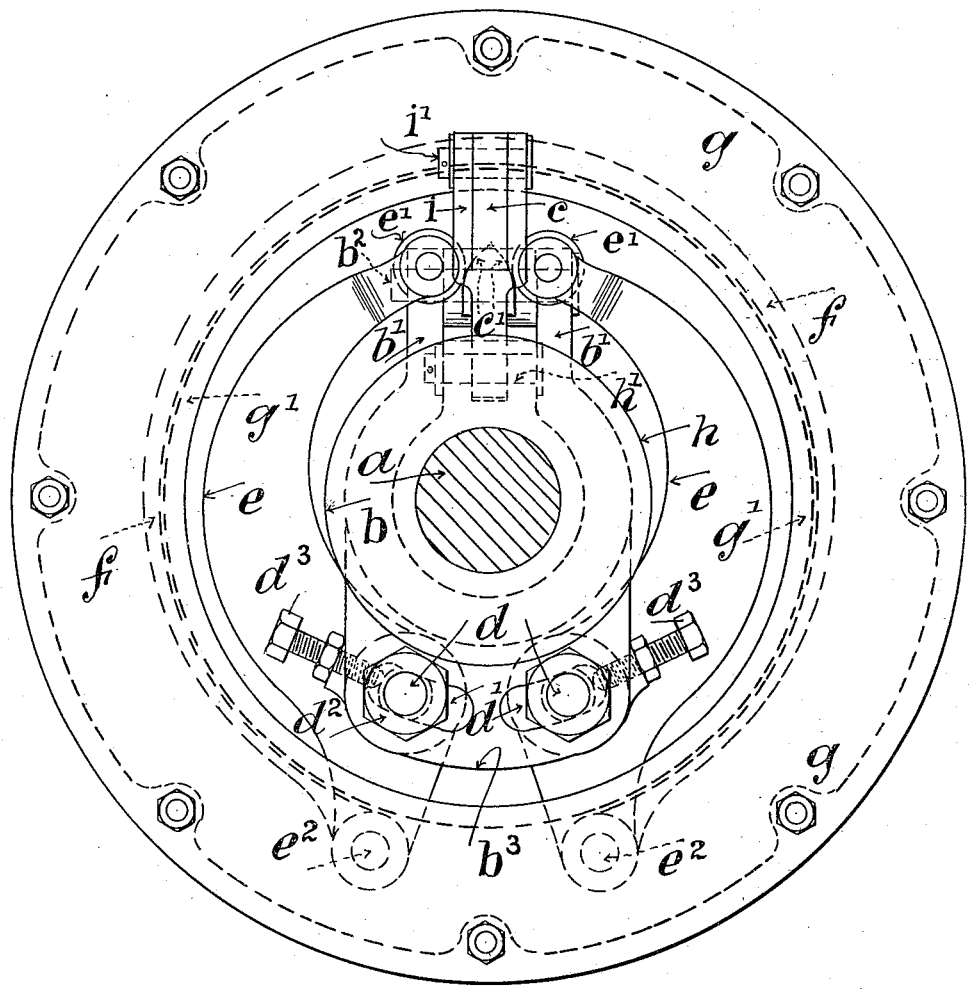
Figure 2:
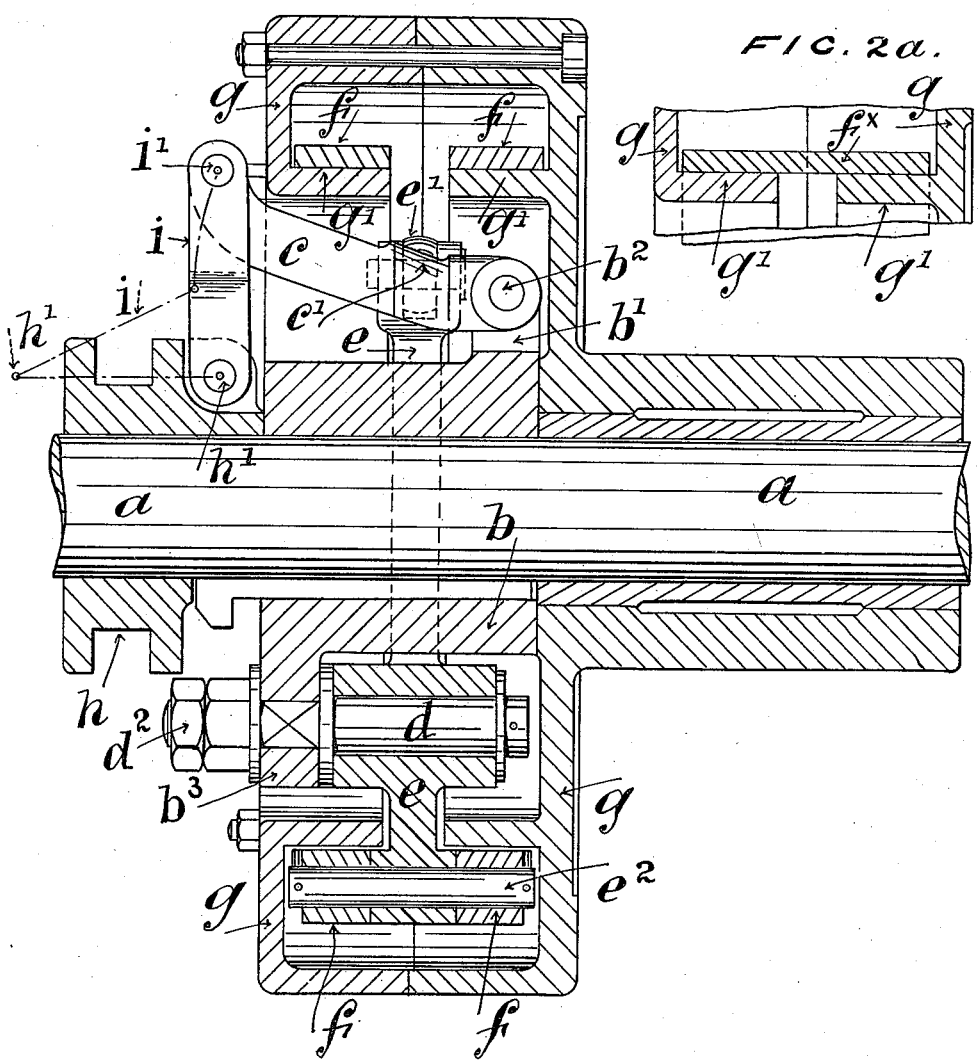
Figure 3:
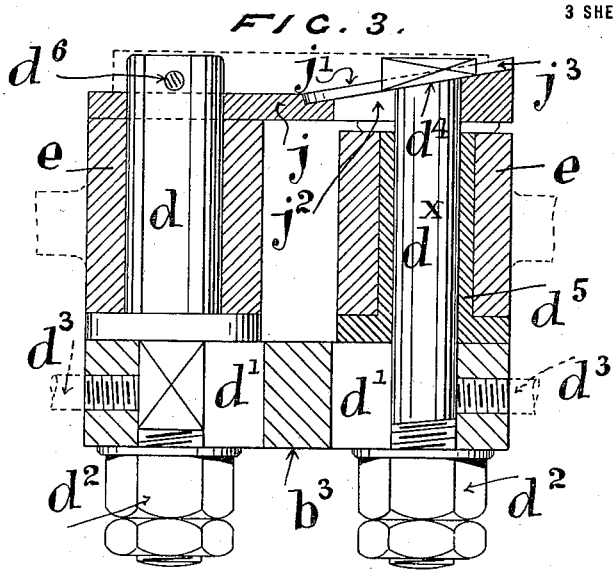
Figure 4:
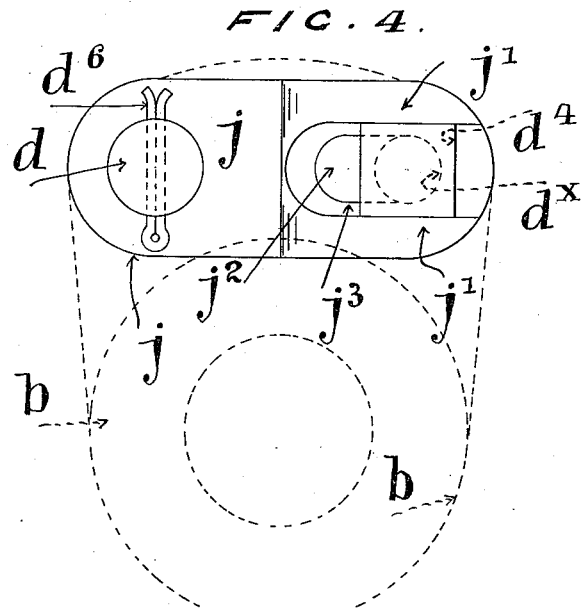

The drawings illustrate the improved clutch and its details, and, in said drawings: Figure 1 shows a front view of the clutch. Fig. 2 is a cross-section, the clutch being illustrated as in gear. Fig. 2ª is a detail view showing the use of one flexible band. Fig. 3 shows a detail section of means which may be utilized to resist any tendency of the studs or centers for the pivoted levers to move apart during actual working, such means including a slotted plate, &c. Fig. 4 is a detail rear elevation of part of Fig. 3 and shows clearly said slotted plate.

In making my improved clutch I key or otherwise secure upon the driving shaft $a$ a suitable boss-like casting $b$ and this casting is formed with lugs or ears $b'$ to support the fulcrum $b^2$ of an actuating lever $c$ to be hereafter described. This boss-like casting $b$ is also provided with a flange $b^3$ which supports, in curved slots $d'$ formed therein, two adjustable pins or studs $d$ and upon each of said studs or on a sleeve applied thereto is fulcrumed levers $e$ of approximately the form shown. The curved arms of the two levers $e$ encircle the boss of the casting $b$ and in such manner that the ends of said arms lie adjacent to the actuating lever $c$ but in a plane at right-angles thereto. The said ends of the levers $e$ are recessed or formed with bored ears to take each a small anti-friction bowl $e'$.

To the short and approximately straight arms of the two levers $e$ I apply pins $e^2$ and to such pins I connect the ends of the flexible metallic bands or the flexible encircling clips $f, f$. I may use one broad flexible band $f^\times$ bridging across the two flanges $g', g'$ as the detail view Fig. 2ª shows, or I may use two such bands or clips $f, f$, as illustrated by the full lines Fig. 2, so that when the clutch is looked at end-on one band lies exactly in the rear of the other. The flexible band $f^\times$ or the two bands $f, f$, encircle flanges $g', g'$ cast on the halves $g, g$ of the inclosing drum or clutch cover and the ends of the band or bands is or are suitably pivoted or jointed to the pins $e^2$ at the ends of the short arms of the levers $e$.

The inclosing drum or clutch casing is made in parts, and, as stated, preferably in two parts $g, g$, the one being conveniently turned with an annular inside flange and the other with an annular inside flange and a long boss. Thus, when put together so that the flanges abut, the two halves inclose the levers, the boss-like casting, and entirely mask the flexible band or bands. The two halves $g, g$ can be readily put together and may be held by bolts or the like applied at intervals.

To operate the clutch, I use a sliding sleeve $h$ fitting on the driving shaft $a$ and this sleeve has pivoted thereto at $h'$ a link $i$, or the like equivalent, which in turn is pivoted at $i'$ to the clutch actuating lever $c$. This clutch actuating lever has a double wedge shaped portion $c'$ formed therewith or applied thereto, or, otherwise has inclined or curved faces, and which shaped portions lie between the bowls $e', e'$, on the end of the levers.

When the sleeve $h$ is pushed-in, the wedges or faces $c'$ on the actuating lever $c$ force the bowls $e'$ apart, and so acting on the levers $e$ the flexible band or bands $f$ is or are tightly contracted around the annular flanges $g'$. By withdrawing the sleeve $h$, the actuating lever $c$ moves inward, the bowls approach, and the flexible band or bands is or are released.

The pivot studs $d$ for the levers fit, as stated, in curved slots in the cast flange $b^3$ and are held in place by the nuts $d^2$ and by other screwed studs $d^3$ arranged at right-angles and which screwed studs $d^3$ serve to set-up or provide for adjustment of the pivot studs $d$ when a flexible band wears.

In order to resist any tendency of the studs $d$ $d$ to move apart when at work, I may utilize the locking arrangement shown at Figs. 3 and 4. According to this I fit a wrought iron plate $j$ behind the bored bosses of the pivoted levers $e$ $e$ and in connection with said studs. This wrought-iron plate is bored to fit over one stud, being held in place by a split pin $d^6$ and is also formed with an inclined portion $j'$ which is slotted at $j^2$ and countersunk at $j^3$. The inner face of the head of the other stud $d^\times$ is inclined at $d^4$ and the head is squared so that the bolt is held against rotation. Both studs $d$, $d^\times$ are held by the nuts $d^2$, and the stud $d^\times$ has a sleeve $d^5$. This modified construction is such that so long as the nuts $d^2$ hold on the stud $d^\times$ then the studs cannot move apart because the incline resists movement of the stud $d^\times$. By the provision of the slot $j^2$ adjustment of the stud $d^\times$ relatively to the stud $d$ is provided for.

The drive from the improved clutch may be taken from the casing, as by a pulley on the long boss, but, as to this I do not restrict myself.

The clutch described, is cheap and simple in construction, and the flexible bands, levers, and actuating levers are all well inclosed. Such a clutch is also well balanced and adapted to work without jar.

The clutch is very compact and all the working parts are easily got at.

I declare that what I claim is:

1. A clutch or coupling comprising, a boss to fit a shaft, a movable actuating lever pivotally supported from said boss, a wedge on the lever, pivoted levers supported by the boss and adapted to be actuated by the wedge of said actuating lever, a casing surrounding said boss and pivoted levers, flanges in said casing, and flexible bands connected to said pivoted levers and adapted to be contracted around said flanges by the pivoted levers when the actuating lever is moved, and sliding means to operate said actuating lever.

2. A clutch or coupling comprising, an inclosing casing, turned inner peripheries inside said casing, an inclosed flexible metal band adapted to be contracted upon the turned inner periphery, a boss within the casing, pivoted levers on said boss, pivotal connecting means between the said levers and the flexible band, a movable actuating lever pivoted to the boss, a wedge on the actuating lever and adapted to engage said pivoted levers for operating the latter, and slidable actuating gear consisting of a sleeve and link for operating the actuating lever whereby said pivoted levers are actuated to operate the flexible band, as described.

3. A clutch or coupling having a boss, pivoted levers carried by said boss, a clutch casing made in halves and inclosing said boss, turned inner peripheries on said halves, flexible bands connected with said levers and adapted to engage with said peripheries, said levers and bands being completely housed within said casing, a movable actuating lever fulcrumed on the boss, said actuating lever being formed with a wedge portion adapted to operate said pivoted levers and a sliding sleeve connected with said actuating lever for operating the latter, as described.

4. A clutch or coupling comprising, a boss, a clutch casing entirely surrounding the boss, inner peripheries in the casing, flexible bands, pivoted levers to which said bands are connected, pivots for said levers located on the inside of the clutch casing, means to resist separation of the pivots for said levers, and a movable actuating lever pivoted to the boss and having a wedge which operates said pivoted levers, as described.

5. A clutch or coupling device comprising, a shaft, a boss to fit said shaft, a clutch casing surrounding the boss, inner peripheries in said casing, a flexible band, pivoted levers on said boss for operating said band and to which said band is connected and center studs therefor, means to resist separation of such studs, consisting of a slotted plate, an inclined face to such plate, and a single movable actuating lever having a wedge-shaped portion and operated by sliding gear on the shaft to work the pivoted levers, as described.

6. A clutch or coupling device comprising, a boss, a clutch casing surrounding the same, inner peripheries in said casing, levers on said boss, a flexible band connected to said levers, pivoted studs for such levers, means to resist separation of said studs, a single movable actuating lever pivoted to the boss a wedge on such actuating lever for operating said pivoted levers, and means for operating said actuating lever.

In testimony whereof I have signed my name to this specification in the presence of two subscribing witnesses.

LEONARD TAYLOR.

Witnesses:
RICHARD WEBSTER IBBERSON,
NORMAN KIERNAN.

Copies of this patent may be obtained for five cents each, by addressing the "Commissioner of Patents, Washington, D. C."